United States Patent [19]

Penato et al.

[11] Patent Number: 5,117,448
[45] Date of Patent: May 26, 1992

[54] WEIGHT COMPENSATION DEVICE FOR X-RAY TUBE COMPRISING PASSIVE MAGNETIC BEARINGS

[75] Inventors: Jean-Marie Penato, Les Essarts le Roi; Pierre Noualhaguet, Issy les Moulineaux; Michel Laurent, Plaisir, all of France

[73] Assignee: General Electric CGR S.A., Issy les Moulineaux, France

[21] Appl. No.: 672,687

[22] Filed: Mar. 20, 1991

[30] Foreign Application Priority Data

Mar. 20, 1990 [FR] France .................. 90 03523

[51] Int. Cl.⁵ .............................. H01J 35/10
[52] U.S. Cl. .............................. 378/132; 378/131; 310/90.5
[58] Field of Search ............... 378/132, 121, 125, 126, 378/127, 131, 144; 310/90.5

[56] References Cited

U.S. PATENT DOCUMENTS

| | | | |
|---|---|---|---|
| 4,012,085 | 3/1977 | Kunderman | 384/220 |
| 4,511,190 | 4/1985 | Caye et al. | 310/90.5 |
| 5,010,563 | 4/1991 | Laurent et al. | 378/132 |

FOREIGN PATENT DOCUMENTS 0201406 12/1986 European Pat. Off. .
2231085 12/1974 France .

OTHER PUBLICATIONS

Patent Abstracts of Japan, vol. 7, No. 31 (M-192) [1176], Feb. 8, 1983; & JP-A-57 186 618, Nov. 17, 1982.
IEEE Transactions on Magnetics, vol. MAG-17, No. 1, Jan. 1981, pp. 1169-1173, IEEE, NY U.S.A.; "Permanent Magnet Bearings and Couplings"-J. P. Yonnet.

*Primary Examiner*—Janice A. Howell
*Assistant Examiner*—David P. Porta
*Attorney, Agent, or Firm*—Oblon, Spivak, McClelland, Maier & Neustadt

[57] ABSTRACT

In an X-ray tube wherein the rotor is supported by passive magnetic bearings, the respective positions of which are such that the rotor is offset in the direction opposite that of the anode, the bearings are mounted on an elastic system which has the effect of compensating for the axial component of the weight of the rotor and of the anode should the tube be tilted.

6 Claims, 3 Drawing Sheets

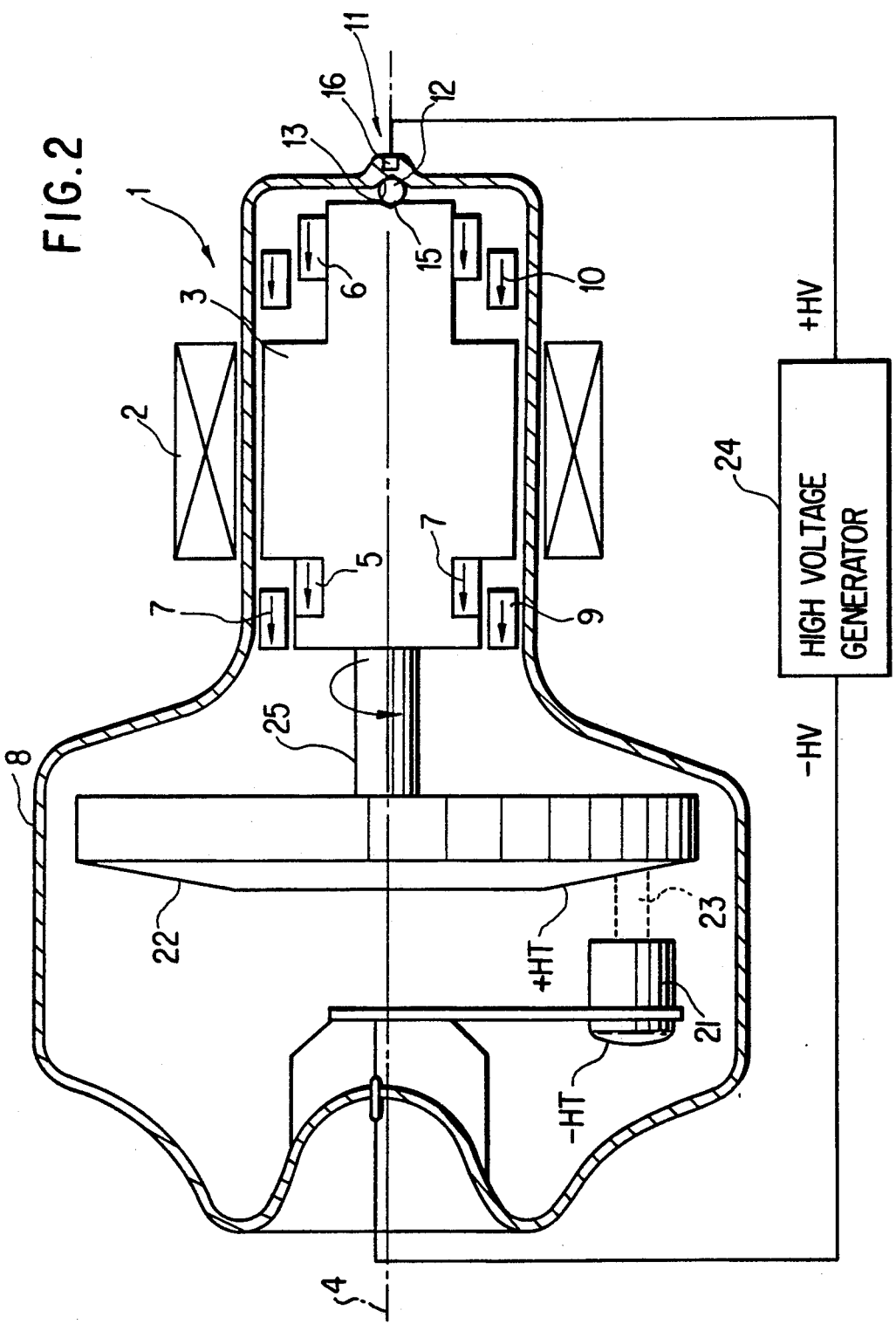

WEIGHT COMPENSATION DEVICE FOR X-RAY TUBE COMPRISING PASSIVE MAGNETIC BEARINGS

BACKGROUND OF THE INVENTION

1. Field of the Invention

The invention relates to X-ray tubes with rotating anodes wherein the suspension system of the anode has only passive magnetic bearings. More particularly, in such tubes, it relates to a device for compensating the weight of the assembly formed by the anode and the rotor.

2. Description of the Prior Art

X-ray tubes, for example those used for medical diagnosis, are generally constituted (FIG. 2) like a diode, i.e. with a cathode 21 and an anode 22 or anti-cathode. These two electrodes are enclosed in a vacuum-tight casing 8 that enables electrical insulation to be set up between them. The cathode 21 produces a beam of electrons 23 and the anode 22 receives these electrons on a small surface area forming a focal spot from which the X-rays are emitted.

When a high supply voltage is applied by a generator 24 to the terminals of the cathode 21 and of the anode 22 in such a way that the cathode is at the negative potential $-HV$, a current called anode current is set up in the circuit through the generator 24 providing the high supply voltage. The anode current goes through the space between the cathode and the anode in the form of the beam of electrons 23 which impinge on the focal spot.

A small proportion of the energy dissipated to produce the beam of electrons 23 is converted into X-rays. The rest of this energy is converted into heat. Because of this fact, and also because of the substantial instantaneous power values (in the range of 100 KW) brought into play, and the small dimensions (about one millimeter) of the focal spot, it has long been the practice for manufacturers to make X-ray tubes with rotating anodes where the anode is made to rotate in order to distribute the heat flux over a crown or ring called a focal ring, with an area that is far greater than that of the focal spot, the usefulness of this structure being all the greater as the rotation speed is high (generally between 3,000 and 12,000 rpm).

A standard type of rotating anode has the general shape of a disk with an axis of symmetry 4 about which it is made to rotate by means of an electrical motor 1. The electrical motor has a stator 2 located outside the casing 8 and a rotor 3 that is mounted in the casing 8 of the X-ray tube and positioned along the axis of symmetry 4, the rotor being mechanically fixed to the anode by means of a supporting shaft 25.

It is become increasingly common to use permanently operating X-ray tubes. This leads to ever greater levels of dissipated energy. To distribute the temperature of the anode more efficiently, it is made to rotate at ever higher rotation speeds, of the order of 10,000 rpm, in mechanical type tubes where the rotor is mounted on ball bearings. These ball bearings have to work under very difficult conditions for the temperature is great and the high vacuum of the tube in which they are placed prevents lubrication by means of a liquid.

Besides, a mechanical system such as this generates noises and vibrations that are detrimental to the practitioner's and patient's comfort as well as to the quality of the image obtained.

To overcome the drawbacks of mechanical bearing systems, it has been proposed to make devices for the magnetic suspension of the rotor-anode assembly: this prevents any mechanical friction.

It may be recalled that, to maintain the position of a cylindrical body 30 with a shape generated by revolution, having an axis $O_1Z$ (FIG. 1), it is necessary to have control over five degrees of freedom along the axes, $O_1X_1$, $O_1Y_1$, $O_2X_2$, $O_2Y_2$ and $O_1Z$, with this body retaining the ability to rotate about the axis $O_1Z$.

According to Ernshaw's theorem, it is impossible to obtain the complete magnetic levitation of a body, i.e. magnetic levitation without any physical contact, only passively, i.e. through the use of permanent magnets only. This is why all the magnetic bearing devices proposed up till now to provide for the rotation of a rotor-anode assembly of an X-ray tube have at least one active path set up by means of an electro-magnet associated with an electronic circuit for positional servo-control along the axis corresponding to this active path.

It therefore becomes necessary to make a fairly complex active system to maintain, for example, the position of the rotor along the axis $O_1Z$. To this end, it is necessary to have position detectors: the information on positional deviation given by these detectors controls the value of the current in the electro-magnet so as to reduce this deviation.

In the French patent application No. 88 12483, filed on Sep. 23, 1988, a system has been proposed for the suspension of a rotating anode of an X-ray tube, of the type with passive magnetic bearings, wherein the maintaining of the longitudinal position of the rotor along the axis of rotation does not require the setting up of a complex servo-control system. The proposed system has (FIG. 2) at least two first magnetized rings, 5, 6 fixed to the rotor 3 and at least two other magnetized rings 9, 10 fixed to the casing 8 of the tube, said rings 5, 6, 9 and 10 being positioned in relation to one another so that the rotor 3 can rotate without friction about the axis of symmetry 4 and so that it is axially offset so as to come into contact with a stop 11 positioned on the side opposite that of the anode 22. The force of contact with the stop 11, due to the repulsion of the magnetic rings 5, 6, 9 and 10, should be as weak as possible when the anode is in an extreme angular position such that its weight moves it away from the stop 11. For any other position, the force of the contact will be greater and will have the drawback of increasing wear and tear at the points of contact of the stop 11.

This drawback is not bothersome when the axis 4 of the anode remains horizontal but becomes so when the axis 4 has to be inclined. This is the case in a scanner where the rotation plane of the tube, which corresponds to the plane of the patient's section that is to be displayed, tilts over to either side of the vertical plane, or in a mammography machine in which there is a complete tilting of the tube, with the anode being capable of taking a high position or a low position.

SUMMARY OF THE INVENTION

The aim of the present invention, therefore, is to make a device to compensate for the weight of the rotor-anode assembly in an X-ray tube with rotating anode, of the type with passive magnetic bearings.

The device relates to a device for weight compensation in a suspension system of a rotating anode of an X-ray tube that has a rotor rotating about an axis, one end of which has the anode, a stator positioned outside the tube, said suspension system having at least two first ring-shaped crowns or rings fixed to the rotor and at least two other magnetized rings, said rings being positioned with respect to one another so that the rotor can rotate without mechanical friction about a rotational axis and so that it is axially offset so as to come into contact with a stop, wherein the device for compensating the weight of the rotor and the anode includes an elastic system to support at least one of said at least two other magnetized rings.

In one embodiment, the elastic system has a movable structure to support at least one magnetized ring and a spring that connects said structure to a fixed element.

In another embodiment, the elastic system has at least one elastic washer, the peripheral part of which is fixedly joined to a fixed element and the central part of which bears the magnetized ring.

BRIEF DESCRIPTION OF THE DRAWINGS

Other, features and advantages of present invention shall appear from the following description of a particular exemplary embodiment, said description being made with reference to the appended drawings, wherein:

FIG. 2 is a longitudinal schematic drawing of an X-ray tube including a prior art suspension system with passive magnetic bearings;

DETAILED DESCRIPTION OF THE INVENTION

Figure 1:
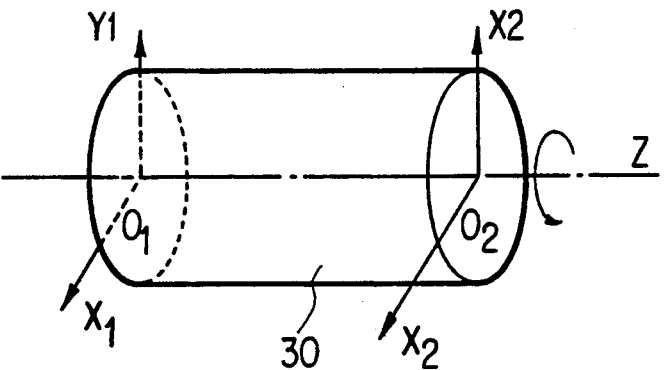
FIG. 1 is a schematic drawing showing the six degrees of freedom of a body.

In FIG. 2, which has already been partly described in the introduction, a drive motor 1 of an anode 22 of the X-ray tube has a rotor 3 that can rotate about a rotation axis 4. One of the ends of the rotor bears the anode by means of a supporting shaft 25. This rotor 3 is held in levitation by passive magnets of which there are four in FIG. 2. Each end of the rotor 3 bears a ring-shaped permanent magnet 5 and 6. The direction of the magnetization is represented by arrows such as the one referenced 7. Each magnet 5 and 6, borne by the rotor 3, cooperates respectively with a permanent magnet 9 and 10 which is fixed, for example, to the internal wall of the casing 8 of the tube. These fixed permanent magnets 9 and 10 too have the shape of a ring and the direction of their magnetization is indicated by the arrows 7. The rotor 3 cooperates with a stator 2 which is positioned outside the casing 8.

It is easy to understand that, with the direction of the magnetizations, a magnetic force of repulsion keeps the rings 5 and 6 radially at a distance from the rings 9 and 10 in such a way that rotor 3 can rotate about the axis 4 without coming into contact with the magnetic rings 9 and 10. The rings 5, 6, 9 and 10 form what are called passive magnetic bearings.

With the directions of the magnetizations indicated in FIG. 2, it will also be understood that, in the longitudinal direction, along the rotation axis 4, there is a longitudinal force that tends to make the rings escape from one another's influence once the planes of these rings are no longer in exact coincidence. To keep them in coincidence, means are usually provided to detect the longitudinal shift on one side or on the other, and to correct it, for example by means of one or more electro-magnets.

Such a coincidence is not sought: on the contrary, there is provision to offset the fixed rings 9 and 10 and movable rings 5 and 6 with respect to one another in a determined direction so as to avoid the unstable equilibrium of the central position of coincidence. The direction of this offset is such that the anode 22 approaches the fixed rings 9 and 10. In order to limit the extent of this motion, a stop 11 is positioned at the end of the rotor opposite the end bearing the anode 22. This stop also acts as an electric conductor for the anode current. It should therefore have characteristics enabling it to fulfill these two functions. As a stop, it should be designed to have the minimum degree of friction so as not to lose the advantages given by the magnetic bearings. As an electric conductor, its electric contact with the rotor should be good enough to conduct the anode current in preventing local heating.

The stop 11 may be made in different ways, in keeping with the following principles. The contact should be made along the rotation axis of the rotor, i.e. at points where the linear speed is almost zero. The nature and the geometry of the materials used are chosen so as to limit wear and tear while, at the same time, providing for efficient electrical contact and efficient electrical conduction.

In FIG. 2, the stop 11 has been made by means of a single ball 12 that rests, on the rotor side, in a conical blind hole 15 drilled along the axis 4 and, on the tube casing 8 side, in another blind hole 13, drilled axially on the output terminal 16 which is fixedly joined to the casing 8.

With a suspension system such as this, the force of contact on the stop 11 varies with the angular position of the axis 4 with respect to the horizontal. The device according to the invention makes it possible to compensate for these variations of the force of contact with the stop and shall be described in relation to the FIGS. 3, 4 and 5, in which the elements identical to those of FIG. 2 bear the same references.

Figure 5:
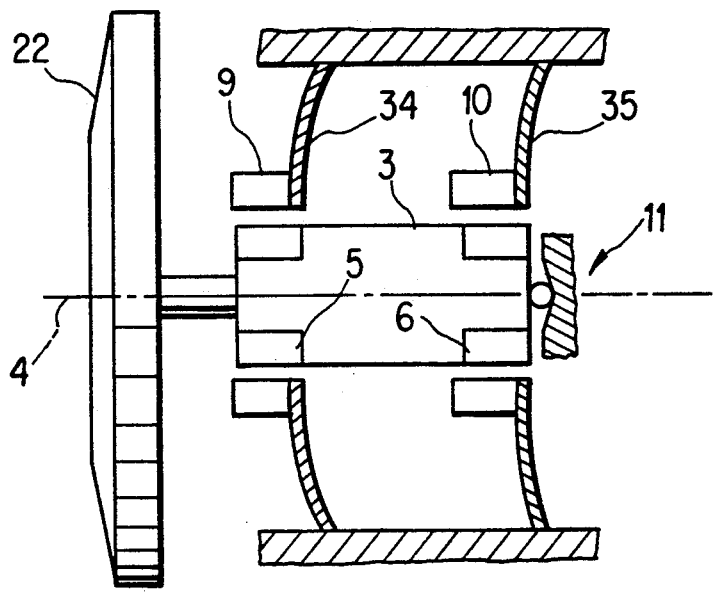
FIG. 5 is a schematic view showing an embodiment of the device, according to the invention, designed to compensate for the weight of the rotor-anode assembly.
Figure 3:
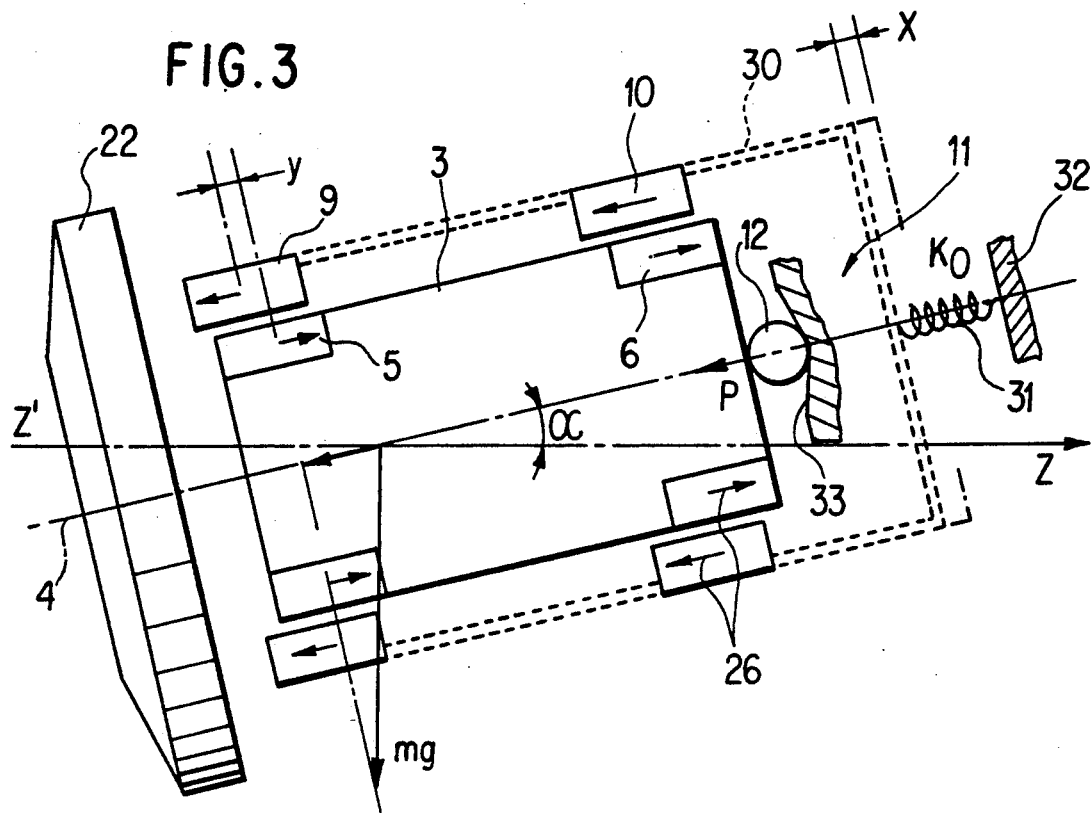
FIG. 3 is a schematic view showing a device according to the invention designed to compensate for the weight of a rotor-anode assembly.
Figure 4:
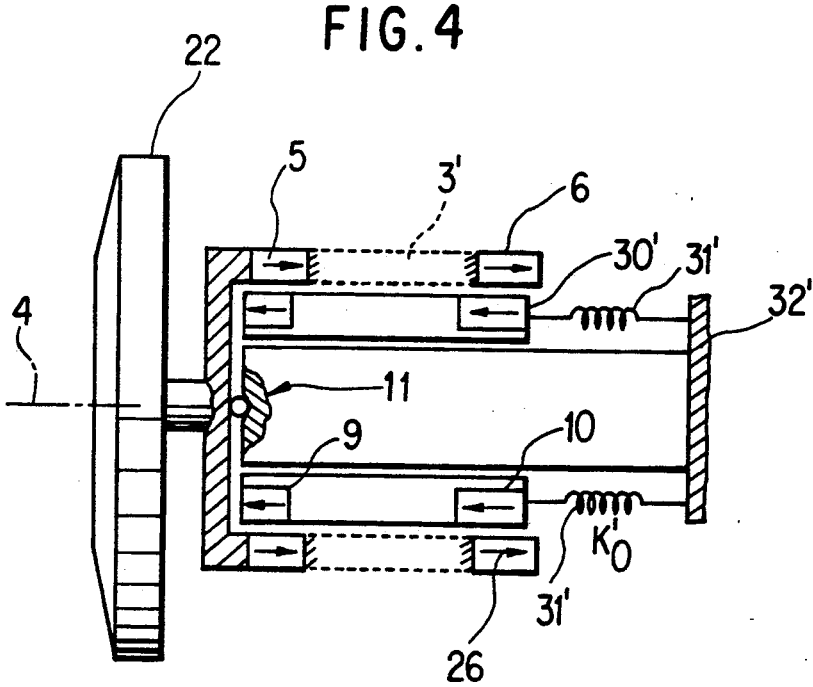
FIG. 4 is a schematic view showing another device according to the invention designed to compensate for the weight of a rotor-anode assembly.

Whereas, in FIG. 2, the arrows 7 represent the direction of the magnetization, in FIGS. 3, 4 and 5, the arrows 26 represent forces.

FIG. 3 gives a schematic view of the compensation device according to the invention, in the form of an elastic system comprising, for example, a frame or structure 30 to support the magnetic rings 9 and 10 and a spring 31, with a stiffness $K_o$. One end of this spring 31 is fixedly joined to a fixed element 32 and its other end is fixedly joined to the frame 30. Furthermore, the rotor 3 has a fixed position and the direction of the magnetic forces is such that it exerts a force p on the stop 11.

If the stator-rotor of FIG. 3 is to be in equilibrium, the following conditions must be fulfilled:

For the rotor 3, the axial component of the weight of the rotor-anode assembly, which would create a variation in thrust on the stop, should be precisely compensated for by a variation in the force resulting from the offset between the planes of the magnetized rings;

For the magnetized rings 9 and 1, or at least one of them, the variation in the reaction of the rotor, combined with the axial component of the weight of these rings and their support 30, must be precisely compensated for by the return or pull-back force of the elastic system.

These two conditions may be written in the form of two linear equations if a relationship of proportionality is assumed:

firstly, between the repulsive force of the magnets and the offset y between their planes, which corresponds to a "magnetic spring" with a stiffness K, and secondly, between the force exerted by the elastic system and the offset x of the magnetized rings 9 and 10 with respect to a reference position, which corresponds to a "mechanical spring" with a stiffness $K_o$.

The axial equilibrium of the rotor-anode assembly is given by:

$$mg \sin\alpha + p = Ky \quad (1)$$

The axial equilibrium of the magnetized rings 9 and 10 and of their support 30 is given by:

$$mg \sin\alpha + Ky = K_o x \quad (2)$$

equations wherein:
m is the mass of the rotor-anode assembly,
M is the mass of the magnetized rings 9 and 10 and of their support 30,
p is the thrust on the stop 11,
g is the gravitational acceleration,
$\alpha$ is the angle of inclination of the axis 4 with respect to the horizontal.

Besides, since the position of the rotor is fixed with respect to the stop, the offset y depends only on the position of the magnetized rings 9 and 10, i.e. it differs from x only by a constant $\delta$ such that:

$$y = x - \delta$$

From the equations (1) and (2), the following are obtained respectively:

$$y = \frac{p}{K} + \frac{mg \sin\alpha}{K} \quad (3)$$

$$y = \frac{-K_o \delta}{K_o - K} + \frac{Mg \sin\alpha}{K_o - K} \quad (4)$$

Since the relationship of variation of y as a function of $\alpha$ has to be unique, it follows that:

$$\frac{m}{k} = \frac{M}{K_o - K} \text{ thus } K_o = K \frac{m + M}{m} \quad (5)$$

and $$\delta = -\frac{p}{k} \frac{(K_o - K)}{K_o} = -\frac{p}{K} \frac{M}{M + m} \quad (6)$$

The stiffness $K_o$ of the elastic system and its point of rest corresponding to $y = \delta$ have to be adjusted to fulfill the two conditions given by the formulae (5) and (6) in which:
the values of m and M are known;
p is the thrust on the stop to be obtained;
K may be determined experimentally from the axial repulsive value as a function of the offset y.

For example, the digital values may be the following when $M = 0.1$ m:

$$K_o = 1.1 K \text{ and } \delta = -\frac{p}{K} \frac{0.1}{1.1} = -0.09 \frac{p}{K}$$

as K may be of the order of 20N/millimeter and p may be of the order of 0.4N, $\alpha = -1.8$ microns. For the horizontal position $\alpha = 0$, we have $p = Ky_o$ giving $y_o = 20$ microns The function of the elastic system is to pull the rotor back towards a reference system in proportion to the offset.

This elastic system may be made in different ways which are within the scope of those skilled in the art, for example by using the traction, deflection or torsion of spring rods.

FIGS. 3 and 4 show two other exemplary embodiments of an elastic system such as this using a spring.

In the embodiment of FIG. 3, the magnetized rings 9 and 10 are borne by the structure 30 which is connected to the fixed point 32 by means of the spring 31 with a stiffness $K_o$. The structure 30 encases the rotor 3 bearing the anode 22. As a result of the respective positions of the pairs of magnetized rings 5, 6 and 9, 10, the rotor 3 presses on the stop 11 which is constituted by the ball 12 and a fixed element 33.

In the embodiment of FIG. 4, a structure 30' for supporting the magnetized rings 9 and 10 is positioned inside a rotor 3' which bears the magnetized rings 5 and 6. The rotor 3' comes into contact with a stop 11' around which the structure 30', which is elastically connected to a fixed point 32' by one or more springs 31' with a stiffness $K'_o$, may slide.

Figure 6:
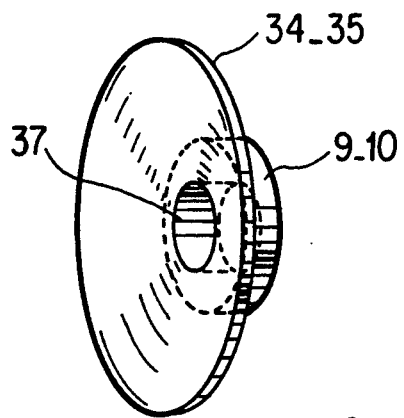
FIG. 6 is a view in perspective of an element of a compensation device according to the invention.

FIGS. 5 and 6 show a particular exemplary embodiment of the elastic system, using elastic washers 34 and 35 that respectively bear the magnetized rings 9 and 10. Each washer 34 or 35 has a peripheral part that is fixedly joined to a fixed element 36 and a pierced central part 37 that bears the corresponding magnetized ring.

In the embodiments shown in FIGS. 3 and 4, the two magnetized rings 9 and 10 are borne by one and the same elastic structure but it is clear that the rings may each be supported by an independent elastic structure as in the embodiment of FIG. 5.

Besides, only one of the magnetized rings 9 or 10 may be supported by an elastic structure, the other having an invariable position. Finally, the invention can be applied to embodiments in which the number of magnetized rings is different from two.

It must be noted that, in the exemplary embodiment of FIG. 2 corresponding to the prior art, the magnetized rings 9 and 10 are positioned within the casing 8. To facilitate the construction of the elastic system bearing the rings 9 and 10 according to the invention, it is preferably for these rings to be positioned outside the casing 8, and the same will apply to the elastic system.

This kind of an arrangement of the elastic system outside the casing 8, i.e. outside the X-ray tube, means that, in FIGS. 3, 4 and 5, the casing 8 goes between the magnets 5, 6 on the one hand and the magnets 9, 10 on the other hand.

However, the elastic system according to the invention can also be made inside the casing 8.

What is claimed is:

1. A device for weight compensation in a suspension system of a rotating anode of an X-ray tube that has a rotor rotating about an axis, one end of which has the anode, a stator positioned outside the tube, said suspension system having at least two first rings fixed to the rotor and at least two other magnetized rings, said rings being positioned with respect to one another so that the rotor can rotate without mechanical friction about a rotational axis and so that it is axially offset so as to come into contact with a stop, wherein the device for compensating the weight of the rotor and the anode includes an elastic system to support at least one magnetized ring.

2. A compensation device according to claim 1, wherein the elastic system has a movable structure to support at least one magnetized ring and a spring that connects said structure to a fixed element.

3. A compensation device according to claim 1, wherein the elastic system has at least one elastic washer, the peripheral part of which is fixedly joined to a fixed element and the central part of which bears the magnetized ring.

4. A compensation device according to claim 1 wherein the elastic system has a stiffness $K_o$ such that $$K_o = K \frac{m + M}{m}$$

and wherein the shift $\delta$ between each pair of magnetized rings is such that $$\delta = -\frac{p}{K} \frac{M}{M + m}$$

K being the coefficient of stiffness of the magnetic system of repulsion,
p being the thrust on the stop of the rotor;
m being the mass of the rotor and of the anode, and
M being the mass of the rings and of their support.

5. A compensation device according to claim 1, wherein the elastic system is positioned inside the X-ray tube.

6. A compensation device according to claim 1, wherein the elastic system is positioned outside the X-ray tube.

* * * * *